United States Patent Office 3,518,123
Patented June 30, 1970

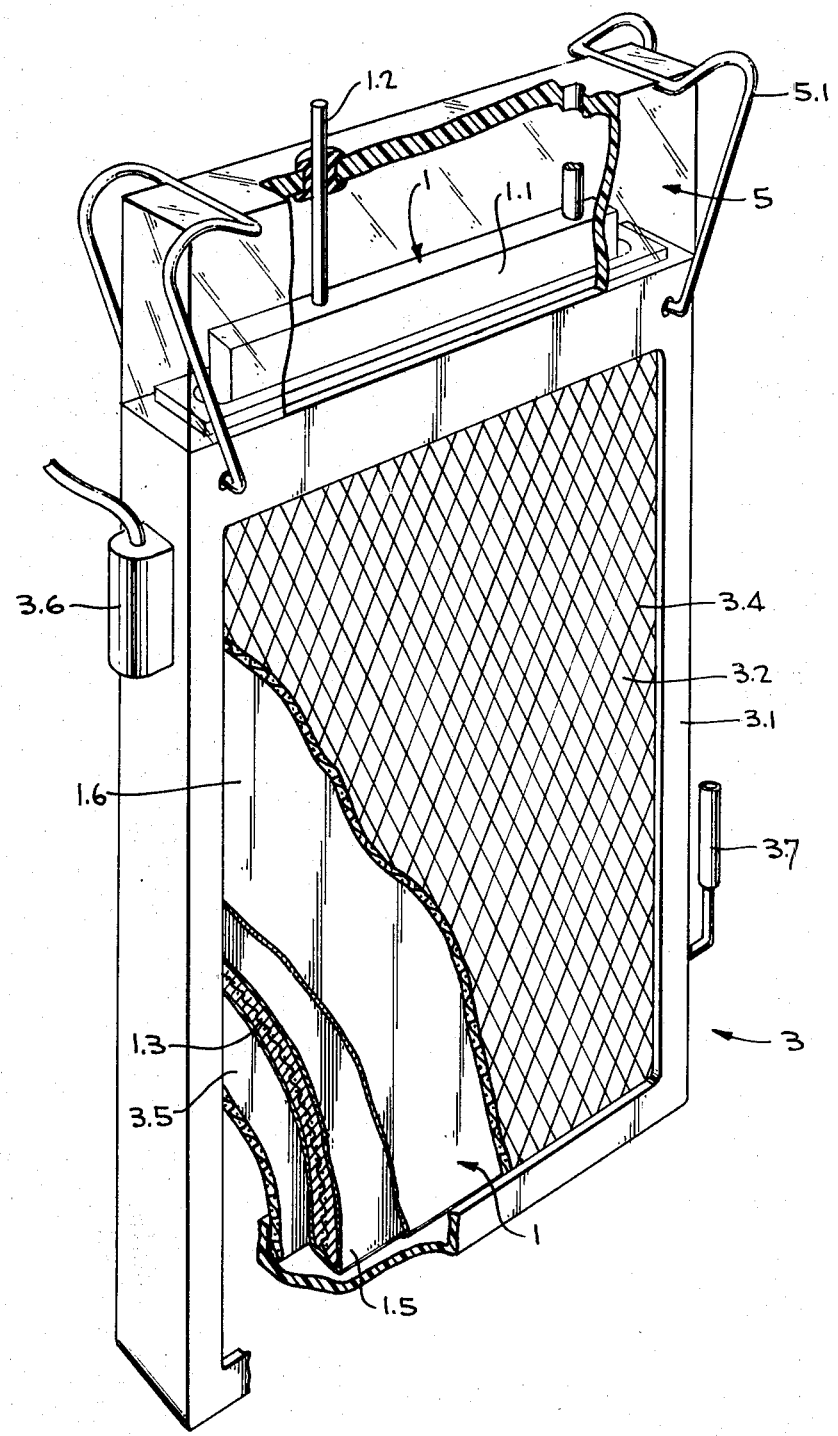

3,518,123
METAL/AIR BATTERY
Emanuel G. Katsoulis, Long Island City, and John J. Prescia, Elmont, N.Y., assignors to Leesona Corporation, Warwick, R.I., a corporation of Massachusetts
Filed June 10, 1968, Ser. No. 735,872
Int. Cl. H01m 27/00
U.S. Cl. 136—86     8 Claims

ABSTRACT OF THE DISCLOSURE

A metal/air cell is described comprising an air depolarized cathode having a hydrophobic polymer member in contact at one surface with an electrocatalyst, a consumable metal anode, and an ion-conductive electrolyte separating said anode and cathode. The cell, which can be mechanically or electrically recharged, includes an electrolyte and/or water reservoir.

FIELD OF INVENTION

This invention is directed to improved metal/air or metal/oxygen cells. More particularly, this invention is directed to metal/air or oxygen (hereinafter referred to as metal/air) cells comprising an air depolarized cathode having a hydrophobic polymer member in contact at one surface with an electrocatalyst, a consumable metal anode, and an ionically-conductive electrolyte separating said anode and cathode. The cells, which are rechargeable, include a reserve electrolyte and/or water compartment.

Background and prior art

Air or oxygen depolarized cells of the type where only the anodes of the cells chemically change during operation are known in the prior art. The early prior art cells of this type, while being particularly suitable for operations where only slow discharge occurs, are not applicable where rapid discharge is necessary. Moreover, since the cathodes of the cells are composed of carbon, recharging is impractical if not impossible. More recently, however, the metal/air cells described by Oswin in co-pending application Ser. No. 533,516, filed Mar. 11, 1966 have become increasingly attractive, particularly from the standpoint of providing a high energy to density ratio and permitting rapid discharge and recharge. The ability to obtain the high energy to density ratio and rapid discharge rates is primarily a result of the air depolarized cathodes employed which comprise a hydrophobic polymer member in contact with an electrocatalyst. These cells can be mechanically recharged by merely removing the anode from adjacent the cathode and inserting a fresh anode (the cathode not being consumed) or they can be electrically recharged. As apparent, therefore, the cells offer substantial flexibility causing them to be particularly adaptable for propelling vehicles in the field or any other application where a high energy to density ratio is essential.

More recently, it has been discovered that while the hydrophobic polymer member utilized in the cathode permits air or oxygen to diffuse through while preventing liquid electrolyte from leaking out of the cell, the polymer member also permits to a limited extent the transpiration of water vapor from within the cell to its environment. Loss of water from the electrolyte reduces the performance of the cell upon continuous operation. Moreover, water loss is particularly critical when electrically recharging the battery, since such charging results in the evolution of gases which carry off even more water from the electrolyte causing the cathode to dry out when not in contact with electrolyte, with consequent flaking or burning of the cathode.

Objects and general description

Accordingly, it is an object of this invention to provide an improved metal/air cell which is not adversely affected by the transpiration of water vapor from the electrolyte.

It is another object of this invention to provide an improved metal/air cell which can be electrically recharged without detrimentally affecting the cathode of the cell through gas evolution.

It is still another object of this invention to provide a metal/air cell having an electrolyte and/or water reservoir.

These and other objects of the invention will be more fully apparent from the following detailed description, with particular emphasis being placed upon the drawings.

Briefly, according to the present invention, a metal/air depolarized cell is constructed which comprises an air depolarized cathode which includes a hydrophobic member in contact at one surface with an electrocatalyst, a consumable metal anode, an electrolyte which is ionically conductive separating the anode and cathode, and a reserve electrolyte or electrolyte make-up compartment. The electrolyte reservoir can be located at various points in the battery design, depending upon the nature of the particular cell and its ultimate application.

More specifically, in the event a bi-cell design of the type described in the Oswin et al. application Ser. No. 517,603, filed Dec. 30, 1965, now U.S. Pat. No. 3,436,270, which utilizes an envelope cathode with a consumable metal anode within the cathode, is employed and the battery is to be electrically recharged, the electrolyte reservoir preferably will be positioned at the top of the cell. According to this configuration, the reservoir can be an extension of the bi-cell, only the extension will not have an active cathode surface. With this embodiment the consumable metal anode will extend partly into the extension retaining the make-up electrolyte keeping the anode and the active cathode surface completely submerged. This prevents dry-out at the top of the cell which could otherwise occur due to gassing of the cell during the recharge cycle. Accordingly, this embodiment (1) provides make-up electrolyte or water lost by transpiration of water vapor through the hydrophobic member; (2) keeps the anode and reactive cathode surface constantly submerged preventing dry-out, warping, and possibly cell burn-up on charging due to the evolution of gases; (3) permits the anode, and separator if used, to extend above the cathode, thereby minimizing gas recombination on the cathode burn-up and the cell from drying out, again protecting the cathode from warping as a result of gassing during recharging; and (4) provides room for evolved gases to mix and dilute.

In the event a bi-cell design of the type described in the aforesaid Oswin et al. application is to be employed but the cells are to be mechanically recharged, or the cells are of the primary throw-away type, the electrolyte make-up or water reservoir preferably will be located on either side of the anode between the bi-cell frame and the anode side wall. This arrangement permits the flow of electrolyte to the dried areas of the anode during operation by both a gravity feed and capillary action.

Drawing and detailed description

The improved construction of the cells of the present invention will be more readily apparent from the accompanying drawing wherein like numerals are employed to designate like parts, and wherein the sole figure illustrates a construction where the reservoir is at the top with the anode extending into the reservoir. The construction of the bi-cell is partially broken away to more fully illustrate the bi-cell.

More specifically, referring to the drawing, a complete bi-cell is shown comprising anode 1, envelope cathode 3, and make-up electrolyte or water reservoir 5. The envelope cathode comprises a frame 3.1, a hydrophobic member 3.2, a conductive support screen 3.4 which is on the internal side of the member but in view of the thinness of the member the configuration of the screen is apparent from the outer surface of the member, and a catalytic layer 3.5. The anode of the cell 1 fits into the envelope cathode 3. The top of the anode and anode separator 1.1 extends above the envelope cathode and into electrolyte reservoir 5. The anode has a current collector or terminal 1.2. The electrolyte reservoir is retained on top of the envelope cathode frame by means of pressure clamp 5.1. Electrical current is removed from the cathode through cathode terminal 3.6. The envelope cathode can optionally contain a water make-up tube 3.7.

In the embodiment shown in the drawing, the anode is a porous zinc sinter having a metal conductive support screen 1.3 extending throughout the porous sinter. The anode is wrapped first in a layer of desulfurized fibrous cellulose 1.5 and then in a highly hydrophilic material, such as Dynel, a Union Carbide trademark for a copolymer of vinylchloride and acrylonitrile, 1.6. This hydrophilic material together with the porous anode retains the electrolyte of the cell. The hydrophobic member of the cathode comprises a continuous unsintered polytetrafluoroethylene film approximately 7 mils thick in contact at one surface with a conductive nickel mesh and an electrocatalyst comprising a uniform admixture of platinum and polytetrafluoroethylene. The frame 3.1 is constructed from any suitable material such as an epoxy resin, a phenolic resin, a urea formaldehyde resin, or the like. Reservoir tank 5 can be constructed of the same material or from any other suitable plastic such as polyethylene, polymethacrylate, and the like. The envelope cathode is preferably constructed as fully described in the aforesaid Oswin co-pending application Ser. No. 533,-516 and comprises a hydrophobic polymer member in contact with a catalytic layer and, preferably, in contact with a conductive metal support. The polymer can be any polymeric material which is hydrophobic and permits the passage of gas, but precludes the flow of aqueous materials. Exemplary polymers are the fluorinated hydrocarbons such as polytetrafluoroethylene, polytrifluoroethylene, polytrifluorochloroethylene, polyvinylfluoride, polyvinylidenefluoride, the hydrophobic co-polymers of two or more of the above materials or co-polymers of such materials with acrylonitrile, methacrylate, polyethylene, and the like. The polymers normally will have a porosity of from about 15 to 85 percent and a uniform pore size distribution of from about 0.01 to about 100 microns, and a thickness of about 0.5 to 10 mils. The catalyst applied to the hydrophobic polymers are pure elements, alloys, oxides, or mixtures thereof which are effective in promoting an electrochemical reaction. Materials such as nickel, silver, gold, carbon, platinum, palladium, and the like, are particularly well suited. The metal support screen which is employed as a current conductor in the cathode or in the anode can be any material which conducts an electrical current and which will withstand the corrosive environment of the cell. Such materials include nickel, titanium, zirconium, and tungsten screens, expanded meshes, or the like. Moreover, it is possible to apply a hydrophilic polymer or other suitable hydrophilic material such as paper over the catalytic layer which will be in contact with the electrolyte of the battery when in operation. Furthermore, in order to obtain a greater voltage from a given battery, it can be desirable to insert an insulating material in the envelope cathode to, in effect, provide two distinct cathodes. By connecting the cathodes of the cells in series, it is possible to obtain an increased voltage. Such cathodes as the term is used herein are still considered to be envelope cathodes. As will be apparent, if the cathode is separated by an insulating material, the anode as well must be separated to form two distinct anodes or one anode for each cathode. Further, the electrolyte reservoir must be compartmented to avoid having a common electrolyte.

The anodes which are to be used herein can be any conventional solid electro-conductor employed in a metal/air or metal/oxygen cell. It is only essential that the material selected be chemically reactive with a compatible electrolyte and be more electro-positive than oxygen. Such materials include lead, zinc, iron, cadmium, aluminum, and magnesium. From the standpoint of cost, capacity, and convenience, porous zinc is the preferred anode material. Although a porous anode is preferred, a solid metal sheet is operable.

The cells will operate on conventional electrolytes including the alkaline materials such as aqueous sodium hydroxide, potassium hydroxide, mixtures of potassium and rubidium, hydroxide, or the like. Acid electrolytes including sulphuric acid, phosphoric acid, and hydrochloric acid can be employed. As is apparent, depending upon the particular electrolyte used, different anode materials can be selected. It is also feasible, and at times desirable, to employ an electrolyte which is trapped in a suitable matrix such as those made up of hydrophilic polymers, ceramic materials, and the like.

It should be appreciated that the instant invention is not to be construed as being limited by the illustrative embodiments. It is also possible to produce still other embodiments without departing from the inventive concept herein disclosed. Such embodiments are within the ability of one skilled in the art.

What is claimed:
1. An improved metal/air or metal/oxygen electrochemical cell containing a gas-permeable envelope cathode comprising a frame, a hydrophobic polymer member within said frame, one surface of said member in contact with an electrocatalyst and the other surface being in contact with air or oxygen, a consumable metal anode positioned within said envelope cathode, an ion-conductive electrolyte containing chamber separating said anode and cathode and means for maintaining said anode and cathode from electrical contact characterized in that said cell includes an electrolyte and/or water-containing reservoir constructed and arranged with said frame to maintain said anode and cathode in continuous electrolyte contact over their entire reactive area during the operation of said cell, said reservoir being in communication with said chamber.

2. The electrochemical cell of claim 1 wherein said reservoir is retained at the top of said cell and said anode extends into said reservoir.

3. The electrochemical cell of claim 1 wherein said reservoir is located adjacent the anode between the envelope cathode and the anode side wall.

4. The electrochemical cell of claim 1 wherein the hydrophobic polymer member includes polytetrafluoroethylene.

5. The electrochemical cell of claim 4 wherein the electrocatalyst in contact with the polymer member is a uniform admixture of polytetrafluoroethylene and a Group I-B metal.

6. The electrochemical cell of claim 5 wherein the anode is a zinc anode.

7. The electrochemical cell of claim 6 wherein the zinc anode is a porous zinc sinter and includes a conductive support screen.

8. The improved electrochemical cell of claim 1 including a water make-up tube.

References Cited

UNITED STATES PATENTS

| | | | |
|---|---|---|---|
| 3,378,406 | 4/1968 | Rosansky | 136—86 |
| 3,436,270 | 4/1969 | Oswin et al. | 136—86 |

WINSTON A. DOUGLAS, Primary Examiner

H. A. FEELEY, Assistant Examiner